United States Patent [19]

Jung et al.

[11] Patent Number: 5,105,188
[45] Date of Patent: Apr. 14, 1992

[54] METHOD FOR INITIATING CONFIGURATION OF A COMMUNICATION NETWORK AFTER THE INTERRUPTION OF AT LEAST TWO-RING SHAPED NETWORKS ARRANGED IN PARALLEL

[75] Inventors: Klaus Jung; Ludwig Heiss; Hermann Reichbauer, all of Munich; Rudi Mueller, Groebenzell, all of Fed. Rep. of Germany

[73] Assignee: Siemens Aktiengesellschaft, Berlin and Munich, Fed. Rep. of Germany

[21] Appl. No.: 428,022

[22] Filed: Oct. 26, 1989

Related U.S. Application Data

[63] Continuation of Ser. No. 190,160, May 4, 1988, abandoned.

[30] Foreign Application Priority Data

May 14, 1987 [DE] Fed. Rep. of Germany ....... 3716178

[51] Int. Cl.$^5$ .............................................. H04B 3/00
[52] U.S. Cl. ............................ 340/825.05; 370/85.12; 370/16.1
[58] Field of Search ............ 340/825.01, 825.05; 370/16.1, 13.1, 14, 85.5, 85.12, 85.14, 85.15, 94.1; 371/8.1, 11.1

[56] References Cited

U.S. PATENT DOCUMENTS

| | | | |
|---|---|---|---|
| 3,787,627 | 1/1974 | Abramson et al. | 370/89 |
| 4,495,493 | 1/1985 | Segarra et al. | 370/86 |
| 4,507,777 | 3/1985 | Tucker et al. | 370/86 |
| 4,677,615 | 6/1987 | Orimo et al. | 370/89 |
| 4,747,100 | 5/1988 | Roach et al. | 370/86 |

FOREIGN PATENT DOCUMENTS 3343692 6/1985 Fed. Rep. of Germany .

OTHER PUBLICATIONS

ANS/IEEE Standard ISO Draft Proposal, pp. 37, 43-47, (1985).

*Primary Examiner*—Donald J. Yusko
*Assistant Examiner*—Dervis Magistre
*Attorney, Agent, or Firm*—Hill, Van Santen, Steadman & Simpson

[57] ABSTRACT

A method is provided for initiating a configuration after the interruption of at least two ring-shaped networks arranged in parallel. After the appearance of malfunctions in the ring lines and ring switching matrix devices in at least two-of-n ring-shaped networks, a configuring in the sense of forming those ring network portions that are still intact into a new ring-shaped network is initiated. Based on the knowledge of the position of the subscriber equipment (interpretation of the address table information) and on the transmission of interrupt information given ring interruptions, the configuring or, respectively, "loop back" connecting is initiated after the identification of the reception and transmission of interrupt information or the identification of the transmission of interrupt information dependent on the position of the appertaining subscriber equipment.

2 Claims, 3 Drawing Sheets

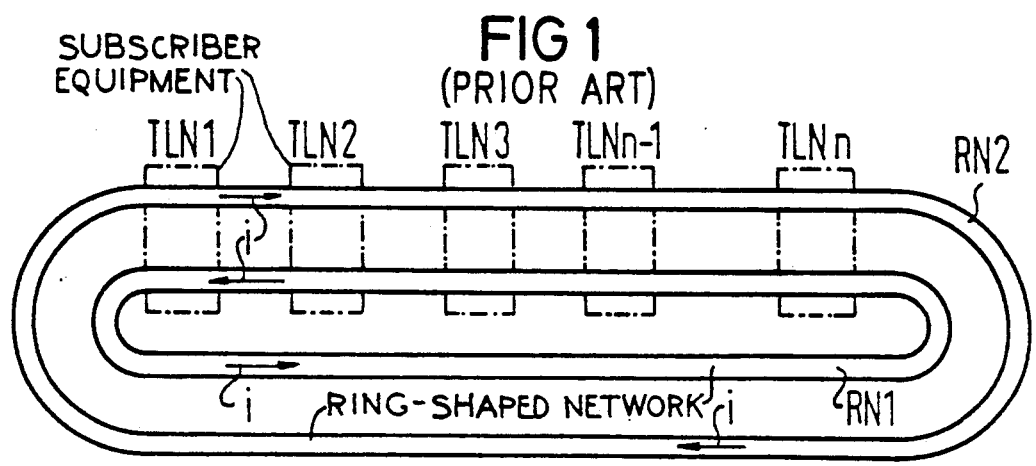
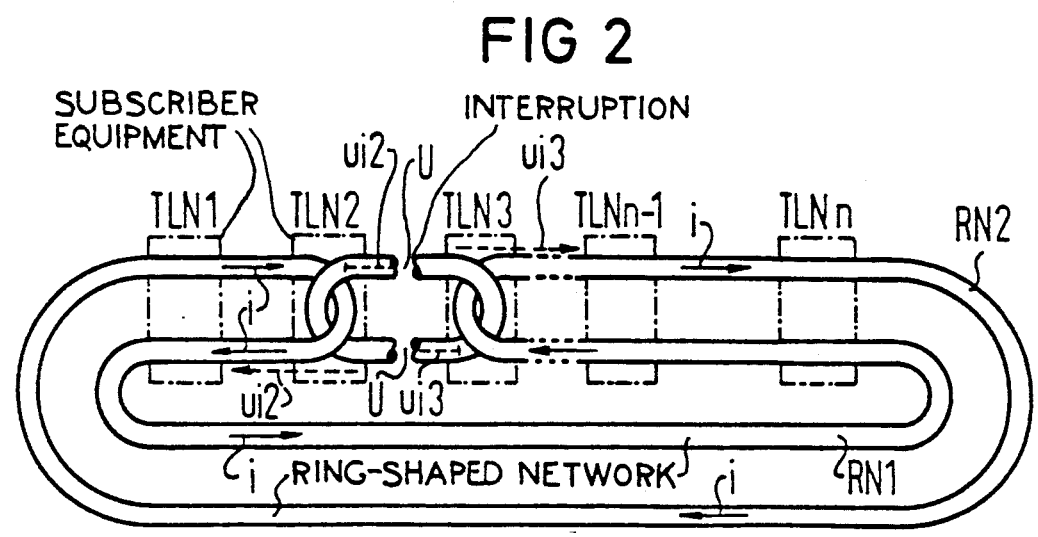

METHOD FOR INITIATING CONFIGURATION OF A COMMUNICATION NETWORK AFTER THE INTERRUPTION OF AT LEAST TWO-RING SHAPED NETWORKS ARRANGED IN PARALLEL

This is a continuation of application Ser. No. 190,160, filed May 4, 1988, now abandoned.

CROSS REFERENCE TO RELATED APPLICATIONS

This application is related to application Ser. No. 192,900 filed May 12, 1988 which issued as U.S. Pat. No. 4,836,317 on Jun. 6, 1989, and Ser. No. 190,691 filed May 5, 1988 which issued as U.S. Pat. No. 4,881,074 issued on Nov. 14, 1989.

BACKGROUND OF THE INVENTION

1. Field of the Invention

The present invention relates to a method for initiating configuration of a communication network formed of n ring-shaped networks arranged in parallel and comprising changing transmission equipment, the communication network having at least three subscriber equipments respectively connected to the n ring-shaped networks and being equipped with n access equipments which serve for respective network access. At least a single ring-shaped network is configured with switch and control devices provided therein, as well as with further control devices, and of respective subscriber equipment given interruptions of at least two ring-shaped networks comprising opposite transmission directions. The configuration is formed from the intact ring network parts by connecting that respective ring line of a ring-shaped network or, respectively, sub-ring network that is incoming in terms of transmission direction to that ring line of the respectively other ring-shaped network or, respectively, sub-ring network in the appertaining subscriber equipment that is outgoing in terms of transmission direction.

2. Description of the Prior Art

The German published application 33 43 692, fully incorporated herein by this reference, discloses a telecommunications system wherein n ring lines are arranged and at least three subscriber stations or, respectively, subscriber equipment are inserted into the ring lines. Each subscriber equipment has n access equipment each of which is formed of a ring or loop switching matrix connected to the ring line and of a ring or loop control equipment. The access of the subscriber equipment onto the respective ring line is controlled and monitored in the access equipment. In cooperation with control equipment of the access equipment, higher-ranking central control devices in the subscriber equipment coordinate the access equipment with one another and are responsible for processing internal subscriber equipment procedures, for example data editing. Given malfunctions of the ring lines, for example line interruption, outage of the ring switching matrix, etc., what are referred to as "loop back" connections (ring loop lines) can be controlled with the higher-ranking control devices and with the control devices present in the access equipment and with the assistance of connections that are arranged between the access equipment. The ring line of a ring-shaped network that is incoming in terms of transmission direction is thereby connected to the ring line of another ring-shaped network that is outgoing in terms of transmission direction. Given interruption of two ring-shaped networks, one or more smaller ring-shaped networks can be configured from those ring network portions that are still intact with the assistance of these "loop back" connections. Under certain conditions, ring-shaped networks formed in this manner no longer include all subscriber equipment in a communications exchange, but communication with one another is enabled for at least a respective portion of the subscriber equipment. Which subscriber equipment the "loop back" connections are to control must then be decided from malfunction-to-malfunction by the subscriber equipment with error analysis procedures that are involved in terms of software and time expense.

SUMMARY OF THE INVENTION

The object of the present invention is to provide an optimally-simple method that saves time and soft:;are expense by means of which a configuration procedure "loop back" connection is initiated after all practically-occurring malfunctions, on at least two ring-shaped networks, such that one or more intact ring-shaped networks are formed from those ring network portions that are still intact.

The above object is achieved, according to the present invention, in a system of the type set forth above which is particularly characterized in that an address table information representing the current configuration of the ring-shaped networks is stored in each subscriber equipment by way of address logging, initiated after each configuring, in that, given an interruption of one or more ring-shaped networks, an interrupt information is generated in each of the access equipment following the interrupt location in the transmission direction and is transmitted in the transmission direction in the respectively interrupted ring-shaped network to all subscriber equipment inserted into the network, in that the configuring after at least one interruption in at least two ring-shaped networks comprising opposite transmission directions is initiated in the sense of forming one or more ring-shaped networks of those ring-shaped network portions that are still intact, being initiated in respectively those subscriber equipment transmitted interrupt information on a ring-shaped network that receive interrupt information on the respectively other ring-shaped network, and in respectively those subscriber equipment lying closest to the current interrupt locations of the ring-shaped networks in the direction opposite to the transmission direction that respectively receive interrupt information on the other ring-shaped network. Having a particularly advantageous effect on the method of the invention are both the incorporation of an address table information identified in each subscriber equipment by way of which the position of a subscriber equipment lying closest to an interrupt location in the opposite transmission direction is identified, as well as the interpretation of interrupt information that the subscriber equipment transmit into the appertaining ring-shaped network given malfunctions of a ring-shaped network. The address table is formed in each subscriber equipment for each ring-shaped network by way of an address logging method, on the basis whereof the positions of the respective subscriber equipment in a ring-shaped network are defined. The up-dating of the address table for each ring-shaped network is executed in the respective ring-shaped network after each configuring. The transmission of interrupt information after a malfunction in a ring-shaped network, for example, can occur based on a "token ring" access protocol of ANSI/IEEE Standard 802.5. According to this access protocol, the interrupt information, these being the "Beacon MAC Frames" in the IEEE Standard 802.5, are transmitted from that subscriber equipment following the interrupt location in the transmission direction. Based on the presence of the information concerning the position of the subscriber equipment in the ring-shaped network and with transmission of interrupt information given ring interruptions, configuring after at least, respectively, one interruption in at least two ring-shaped networks can be initiated with the assistance of the "loop back" connections after the identification of the reception and transmission of interrupt information in a subscriber equipment, or the identification of the transmission of interrupt information, dependent on the position of the appertaining subscriber equipment in such a manner that one or more ring-shaped networks are formed from those ring network portions that are still intact. Since producing address tables and sending interrupt information are also required for other internal subscriber equipment methods or, respectively, procedures, a significantly lower expense for both time and software occurs for an additional method step that initiates the configuring. This leads to a considerable reduction of the program expense and of the dynamic load in the subscriber equipment. The configuring is respectively initiated in those subscriber equipment sending interrupt information on a ring-shaped network that receive interrupt information on the respectively other ring-shaped network and in those subscriber equipment lying closest to the current interrupt locations of the ring-shaped networks in the direction opposite to that of the transmission direction that respectively receive interrupt information on the other ring-shaped network. The identification of sending or, respectively, of receiving interrupt information and the identification of the subscriber equipment that lies closest to the interrupt location can thereby occur at different points in time; the corresponding information that initiates the configuring, however, must be present within a defined time interval that is dependent on the network reaction times.

According to an advantageous feature of the invention, the configuring of the ring-shaped networks can be initiated in all subscriber equipment following a monitoring time that is adapted to the network size and that contains a plurality of unsuccessful configuration attempts of a plurality of subscriber equipment. What this measure assures is that a total outage of one or more ring-shaped networks is recognized early and the appropriate safeguarding of, respectively, recovery measures can be initiated.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a schematic representation of two ring-shaped networks arranged in parallel and having subscriber equipment inserted therein;

FIG. 2 is a schematic representation of two ring-shaped networks, also arranged in parallel, and each having an interruption in each network between two subscriber equipment;

DESCRIPTION OF THE PREFERRED EMBODIMENTS

Figure 3:
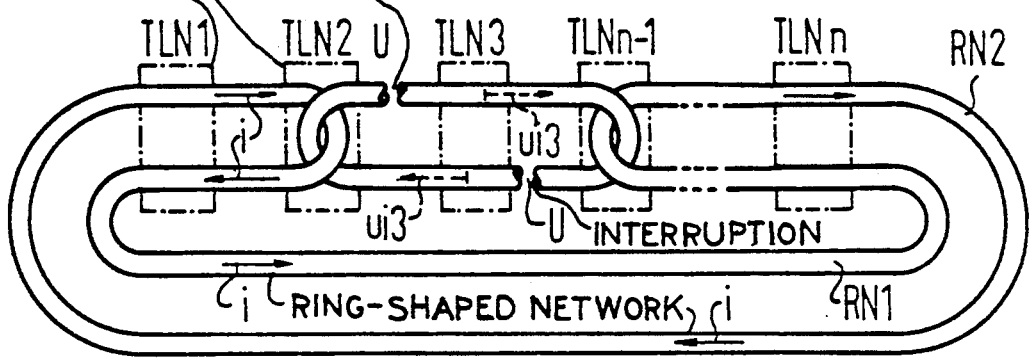
FIG. 3 is a schematic representation of two ring-shaped networks arranged in parallel and each having an interruption in each network respectively preceding a subscriber equipment.

FIG. 1 illustrates a plurality of subscriber equipment TLN1... TLNn that are respectively connected to one another by way of two ring lines arranged in parallel. The two ring lines arranged in parallel form two ring-shaped networks RN1 and RN2 to which each of the subscriber equipment TLN is connected. This double ring configuration represents the initial configuration of the exemplary embodiments set forth with reference to FIGS. 2–5. The transmission direction of the ring information i to be transmitted on the ring-shaped networks is identified with arrows.

In FIG. 2, it is assumed that both ring lines between the subscriber equipment TLN2 and the subscriber equipment TLN3 are interrupted due to, for example, a cable break. The subscriber equipment TLN2, TLN3 following in the transmission direction identify the failure of ring information i to arrive and, therefore, identify the interruptions of the ring-shaped networks RN1 and RN2 and initiate the transmission of interrupt information ui. The interrupt information ui2 are therefore transmitted into the first ring-shaped network RN1 in the subscriber equipment TLN2 and the interrupt information ui3 are thus transmitted into the second ring-shaped network RN2 in the subscriber equipment TLN3. The interrupt information ui2 transmitted by the subscriber equipment TLN2 are communicated from subscriber equipment-to-subscriber equipment TLN in the first ring-shaped network RN1 by way of the implemented ring procedures and ultimately arrive at the subscriber equipment TLN3. Analogously thereto, the interrupt information ui3 transmitted in the subscriber equipment TLN3 are transmitted by way of the second ring-shaped network RN2 and are received in the subscriber equipment TLN2. Both the subscriber equipment TLN2 and the subscriber equipment TLN3 identify that they are respectively transmitting interrupt information ui on one ring-shaped network RN1 or RN2 and are respectively receiving an interrupt information ui on the other ring-shaped network RN. In response thereto, the configuring, i.e. the formation of the "loop back" connections, is initiated both in the subscriber equipment TLN2 and in the subscriber equipment TLN3. In the appertaining subscriber equipment TLN, that respective ring line of a ring-shaped network RN1, RN2 that is incoming in terms of the transmission direction is thereby connected to that ring line of the respectively other ring-shaped network RN1, RN2 that is outgoing in terms of transmission direction. A single ring-shaped network that covers all subscriber equipment TLN is formed with this "loop back" connection, being formed from those network portions of both ring-shaped networks RN1, RN2 that are still intact. The subscriber equipment TLN can again communicate with one another after the execution of appropriate recovery procedures, including the address logging procedure. Although this means a halving of the transmission capacity between the subscriber equipment TLN, the total outage of the network that prevents any and all communication can be avoided. On the basis of the "loop back" connecting, the interrupt information ui transmitted by the subscriber equipment TLN2 or, respectively, by the subscriber equipment TLN3 are respectively reflected in the subscriber equipment TLN2, TLN3 and are respectively transmitted in the direction of the interrupt location U. When due to the restoration of the ring lines, one or both of the two subscriber equipment TLN2, TLN3 receive the corresponding interrupt information ui, then the "loop back" connections are refigured and one of the two or both ring-shaped networks RN1, RN2 are placed back into operation.

By way of example, the first ring-shaped network RN1 is interrupted between the subscriber equipment TLN3 and the subscriber equipment TLNn−1 in FIG. 3 and the second ring-shaped network RN2 is interrupted between the subscriber equipment TLN2 and the subscriber equipment TLN3. The interruptions U, for example, can be caused by cable breaks in the ring lines or by total outage of both reception equipment in the subscriber equipment TLN3. This means that the subscriber equipment TLN3 cannot receive any ring line information i but is itself quite capable of still transmitting ring line information to both ring-shaped networks RN1, RN2. Due to the failure to receive ring line information i, the subscriber equipment TLN3 identifies that both ring-shaped networks RN1, RN2 are interrupted, whereupon interrupt information ui3 are generated in the subscriber equipment TLN3 and are transmitted according to the transmission direction both to the ring-shaped network RN1 and to the ring-shaped network RN2. On the basis of ring transmission procedures, the interrupt information ui3 are communicated through the respective ring-shaped network RN1, RN2 and proceed both to the subscriber equipment TLN2 and to the subscriber equipment TLNn−1. Since both subscriber equipment TLN2 and TLNn−1 lie closest to the current interrupt locations U of the respective ring-shaped network RN1, RN2 in the opposite transmission direction and receive interrupt information ui3 the configuring or, respectively, "loop back" connecting is initiated in both of the subscriber equipment TLN2 and TLNn−1. After the configuring, all subscriber equipment TLN, except the subscriber equipment TLN3, are incorporated into a single ring-shaped network formed of those ring network portions of the first and second ring-shaped networks RN1 and RN2 that are still intact. After the execution of recovery procedures, including that of the address logging method, the subscriber equipment TLN co-incorporated in the newly-established ring-shaped network can again communicate with one another. The subscriber equipment TLN3 continues to transmit interrupt information ui3 that, however, are now reflected in the subscriber equipment TLN2, TLNn−1 as a consequence of the "loop back" connection and that are respectively transmitted in the direction of the interrupt location U. When one or both of the interrupts u or, respectively, of the malfunctions are eliminated in the receiving equipment of the subscriber equipment TLN3, then the subscriber equipment TLN3 receives the interrupt information ui3 and initiates another configuring in the sense of forming one or both of the original, ring-shaped networks RN1 and RN2.

Figure 4A:
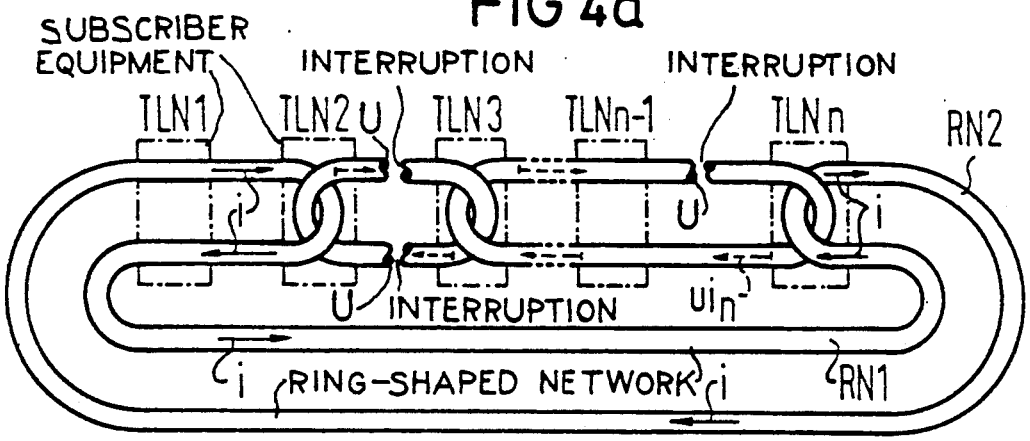
FIGS. 4a and 4b respectively illustrate two ring-shaped networks arranged in parallel and each having an interruption in each ring-shaped network between two subscriber equipment and an additional interruption in a ring-shaped network between two further subscriber equipment.
Figure 4B:
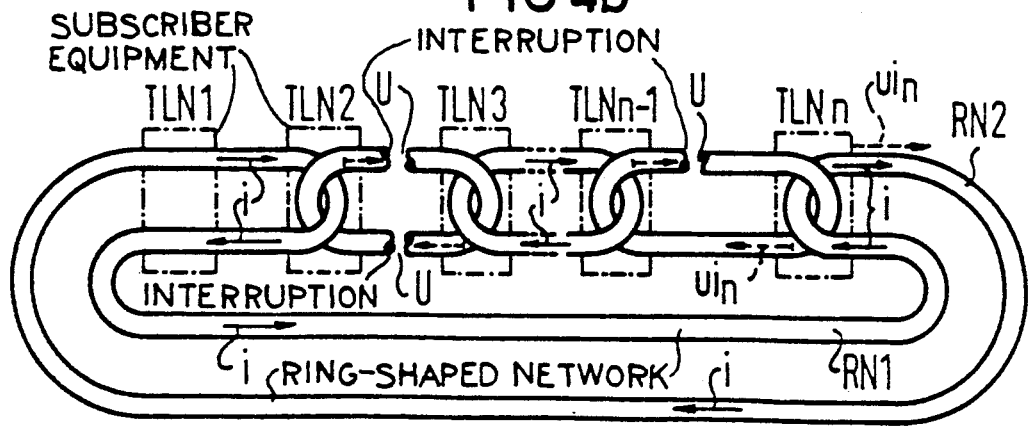

In FIG. 4a (see FIG. 2 also), the ring lines of the first and second ring-shaped networks RN1 and RN2 are interrupted between the subscriber equipment TLN2 and the subscriber equipment TLN3. The initiation of the configuring and the configuring of the ring network portions of both the first and second ring-shaped networks RN1 and RN2 to form a new, single ring-shaped network occurs in accordance with the method set forth with respect to FIG. 2. It is now assumed that, by way of example, an additional interruption U occurs between the subscriber equipment TLNn-1 and the subscriber equipment TLNn in the newly-configured, ring-shaped network due to a further break in the ring line. The subscriber equipment TLNn lies closest to the interrupt location U in terms of the transmission direction and, since, the interrupt U was recognized due to the lack of received ring information i in the subscriber equipment TLNn, it sends interrupt information uin into the newly-formed, ring-shaped network according to the transmission direction. On the basis of appropriate ring transmission procedures, this interrupt information uin proceeds to the subscriber equipment TLN2, is reflected there and, finally, is again received in the subscriber equipment TLNn. An identification is now made in the subscriber equipment TLNn that interrupt information uin are being both transmitted and received, whereupon the configuring or, respectively, the "loop back" connecting is initiated in the subscriber equipment TLNn. After this configuration event, the subscriber equipment TLN1, TLN2 and TLNn form a small, ring-shaped network in which a communication between the subscriber equipment TLn is possible after the execution of the recovery procedure. As a result of the "loop back" connecting in the subscriber equipment TLNn, the interrupt information uin is now fed in the direction of the subscriber equipment TLNn−1. Since the subscriber equipment TLNn−1 lies closest to the interrupt location U, as viewed opposite the transmission direction, and also receives interrupt information uin on the uninterrupted ring line, the subscriber equipment TLNn−1 likewise initiates the configuring or, respectively, the "loop back" connecting. A second, ring-shaped network is formed on the basis of this configuration procedure, this second, small ring-shaped network covering the subscriber equipment TLN3 and the subscriber equipment TLNn−1 and all subscriber equipment TLN that are arranged therebetween, which are not shown on the drawing. After the execution of suitable recovery procedures, the inserted subscriber equipment TLN can also communicate with one another in this second, small ring-shaped network. FIG. 4b then shows that final network configuration that is achieved in the affected subscribers TLN after the application of the procedure of the invention for initiating the configuration. As may be seen from FIGS. 4a and 4b, a further advantage of the method of the invention is that all ring network portions still intact in the original ring-shaped networks RN1, RN2 are used for forming smaller, ring-shaped networks.

Figure 5:
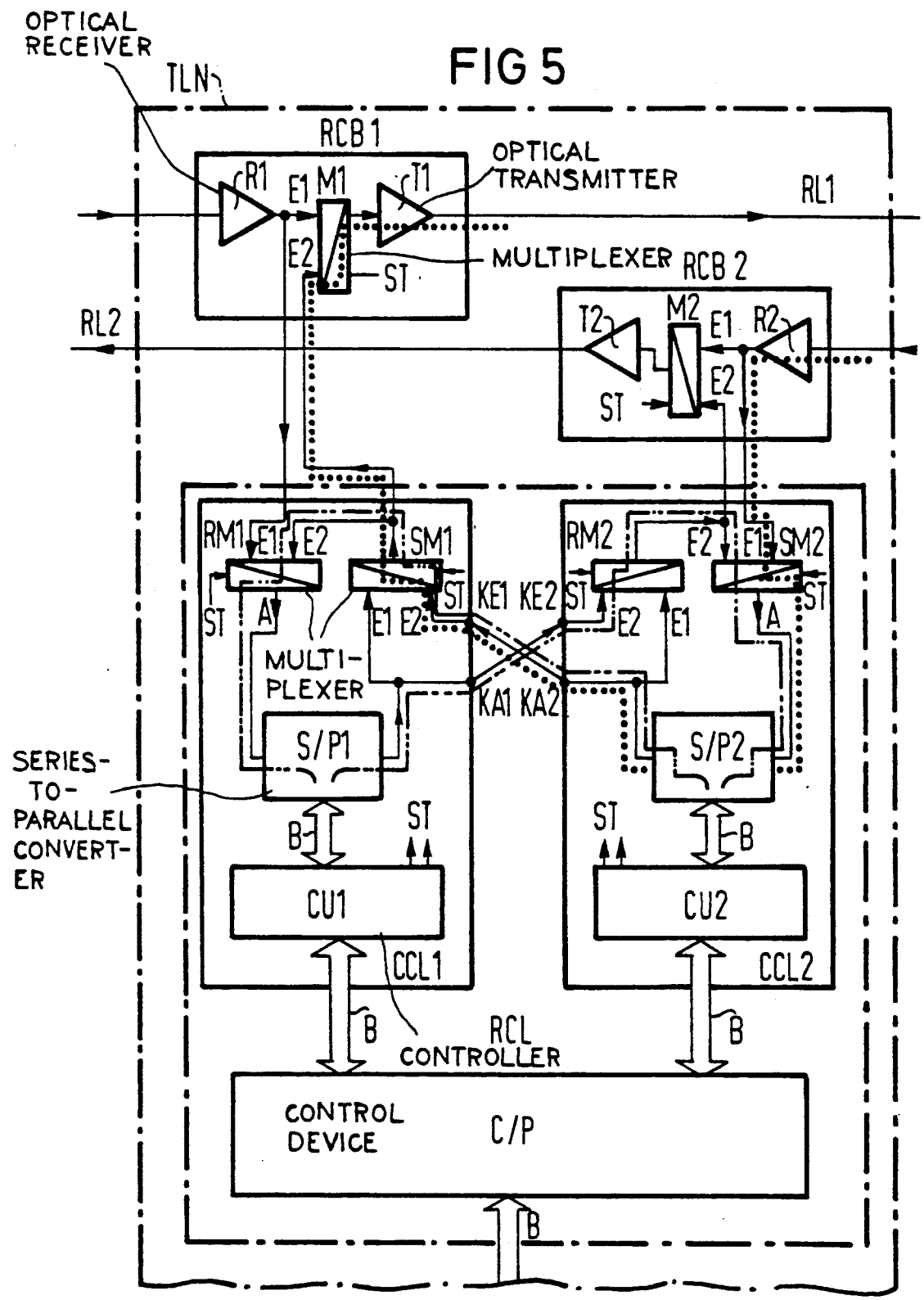
FIG. 5 is a schematic circuit diagram of an arrangement of the system components in a subscriber equipment that effect the initiation of the configuring and effect configuring.

FIG. 5 illustrates those system components of a subscriber equipment TLN with whose assistance the configuring or, respectively, "loop back" connecting is initiated and executed. An identically-constructed ring switching matrix RCB1, RCB2 is respectively inserted into a ring line RL1 of a first ring-shaped network and into a ring line RL2 of a second ring-shaped network, both of the ring lines RL1 and RL2, being realized, for example, with optical light waveguides. The ring line RL1, RL2 that is respectively incoming in terms of the transmission direction is thereby connected to an optical receiver R1, R2. The output of the optical receiver R1, R2 is respectively fed to the input of a multiplexer device M1, M2. The respective ring line RL1, RL2 that is outgoing in terms of the transmission direction is connected to a respective optical transmitter T1, T2 respectively connected to the output of the multiplexer M1, M2. Each of the two ring switching devices RCB1, RCB2 has an identically-constructed access equipment CCL1, CCL2 assigned thereto. Each access equipment CCL1, CCL2 contains a receiving multiplexer RM1, RM2, a transmission multiplexer SM1, SM2, a series-to-parallel converter S/P1, S/P2 and a control device CU1, CU2. Since they are identically constructed, the structure of only a single access equipment CCL1 CCL2 shall be described below.

A first input E1 of the receiving multiplexer M1, M2 is connected to the output of the optical receiver R1, R2 via a corresponding connection. The output A of the receiving multiplexer RM1, RM2 is connected to an input of the series-to-parallel converter S/P1, S/P2. A second input E2 of the receiving multiplexer RM1, RM2 is connected to a second input of the multiplexer M1, M2 of the ring switching matrix devices RCB1, RCB2 via appropriate connections. The output of the series-to-parallel converters S/P1, S/P2 is conducted, first of all, to a first input E1 of the transmitting multiplexer SM1, SM2 and, secondly, to a configuration output KA1, KA2 of the access equipment CCL1, CCL2. The second input E2 of the transmission multiplexers SM1, SM2 is connected to a configuration input KE1, KE2 of the access equipment CCL1, CCL2. The output of the transmission multiplexers SM1, SM2 likewise proceeds onto the second input E2 of the multiplexer M1, M2 in the ring switching matrix device RCB1, RCB2. The series-to-parallel converter S/P1, S/P2 is connected to the control devices CU1, CU2 of the access equipment CCL1, CCL2 via a bus system B composed of data lines, control lines and address lines and is connected to a higher-ranking, channel interface control device C/P via a further, identically-constructed bus system B. Together, the two access equipment CCL1, CCL2 and the higher-ranking channel interface control device C/P form the ring control device RCL. By way of further, identically-constructed bus systems B, the ring control device RCL communicates with the further equipment (not shown) of the subscriber equipment TLN. Each of the multiplexers M, RM, SM is equipped with a control input ST that is respectively connected to a control output ST of the control device CU1, CU2 assigned thereto. The configuration output KA1, KA2 is respectively connected to the configuration input KE2, KE1 of the access equipment CCL1, CCL2 that lies respectively opposite thereto. Dependent on the operating condition of the ring lines RL1, RL2 and of the subscriber equipment TLN, the multiplexers M, RM, SM can be correspondingly controlled with the assistance of the controllers CU1, CU2, C/P and appropriate signals at the control inputs ST of the multiplexers M, RM, SM. The "loop back" connection relevant to the method of the present invention is emphasized by dotted lines. By way of example, the "loop back" connection of that ring line RL2 of the second ring-shaped network RN2 incoming in terms of transmission direction to the ring line RL1 to the first ring-shaped network RN1 which is outgoing in terms of transmission direction in the ring switching matrix device RCB1 is shown, whereby, following a "loop back" connecting, that ring line RL1 of the first ring-shaped network RN1, incoming in terms of transmission direction, is additionally connected via the access equipment to that ring line RL2 of the second ring-shaped network RN1 which is outgoing in terms of transmission direction.

In order to be able to test both access equipment CCL1, CCL2 in case of malfunction without ring switching matrix devices RCB1, RCB2 and ring lines RL1, RL2, a test loop can be formed via the connections between the configuration inputs or, respectively, outputs KA1, KA2, KE1, KE2 and appropriately-controlled multiplexers RM, SM. This test loop, shown in FIG. 5 with a double dotted broken line involves all internal connections and controls in the access equipment in the "internal test" mode.

The following table sets forth the exemplary possibilities of realizing the individual system components of the subscriber equipment TLN.

| | |
|---|---|
| Multiplexers M, RM, SM | TTL circuit SN 74157 |
| Optical reception devices R1, R2 | Siemens LWG components such a V 42253-H4-B4 |
| Optical transmission devices T1, T2 | Siemens LWG components such as V 42253-G4-B5 |
| Series-to-parallel converter S/P1, S/P2 | TTL circuit SN 74LS299 |
| Control device CU1, CU2 | Mask-programmable, customized, integrated circuit |
| Control device C/P | Siemens microprocessor SAB 80186 |

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A method for initiating configuration of a communication network formed of n ring-shaped networks each including ring lines and arranged parallel to one another and providing different transmission direction, the communication network having at least three subscriber equipments respectively connected to the n ring-shaped networks and being equipped with n access equipments serving the purpose of respective network access, whereby at least a single ring-shaped network is configured with switch and control devices provided in the access equipments as well as with further control devices of the respective subscriber equipment given interruptions of at least two ring-shaped networks comprising opposite transmission directions, the interruptions leaving intact ring network parts, being configured from the intact ring network parts by connecting the ring line of a ring-shaped network that is incoming in terms of transmission direction to the ring line of one other ring-shaped network in the appertaining subscriber equipment that is outgoing in terms of transmission direction comprising the steps of:
- storing, in each subscriber equipment, an address table information representing the current configuration of the ring-shaped network by address logging initiated after each configuring;
- generating a beacon MAC-frame, given an interruption of at least one of the ring-shaped networks, in each of the access equipment following the interrupt location in the transmission direction;
- transmitting, in the transmission direction, the beacon MAC-frame in the respectively interrupted, ring-shaped network to all subscriber equipment in the ring-shaped network; and
- configuring, after at least one interruption, at least two ring-shaped networks comprising opposite transmission directions to form at least one ring-shaped network of those ring-shaped network portions that are still intact, including, in those respective subscriber equipment which transmit beacon MAC-frame on a ring-shaped network, receiving the beacon MAC-frame on the other respective ring-shaped network, and, in those subscriber equipment lying closest to the current interrupt locations of the ring-shaped networks in the direction opposite of the transmission direction, receiving the beacon MAC-frame on the other ring-shaped network.

2. The method of claim 1, and further defined as comprising:
- initiating subscriber-directed configuring in all subscriber equipment of the network following a monitoring time adapted to the network size and containing a plurality of unsuccessful configuration attempts of a plurality of subscriber equipment.

* * * * *